(12) United States Patent
Pogue et al.

(10) Patent No.: US 10,200,724 B1
(45) Date of Patent: Feb. 5, 2019

(54) SYSTEM FOR OPTIMIZING DISTRIBUTION OF AUDIO DATA

(71) Applicant: AMAZON TECHNOLOGIES, INC., Seattle, WA (US)

(72) Inventors: Michael Alan Pogue, Sunnyvale, CA (US); Kyle Gordon Haight, San Jose, CA (US); Amit Dubey, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/701,929

(22) Filed: Sep. 12, 2017

(51) Int. Cl.
*H04N 21/233* (2011.01)
*H04L 29/06* (2006.01)
*H04L 12/28* (2006.01)

(52) U.S. Cl.
CPC ....... *H04N 21/233* (2013.01); *H04L 12/2838* (2013.01); *H04L 65/4069* (2013.01); *H04L 65/602* (2013.01); *H04L 2012/2849* (2013.01)

(58) Field of Classification Search
CPC .......... G06F 3/165; H04L 43/10; H04N 5/04; H04N 21/233; H04N 21/4307; H04W 40/18; H04W 56/001; H04W 56/0015; G10L 19/018; H04M 15/735
USPC .......... 370/350, 404, 432, 509; 381/58, 150; 382/190; 700/94; 718/100; 703/6; 704/235; 706/12, 46; 707/706; 725/116
See application file for complete search history.

(56) References Cited

U.S. PATENT DOCUMENTS

| | | | | |
|---|---|---|---|---|
| 7,280,550 B1* | 10/2007 | Rosenboom | .......... | H04J 3/0682 370/404 |
| 8,571,005 B1* | 10/2013 | Vleugels | .......... | G06F 5/16 370/350 |
| 9,781,276 B1* | 10/2017 | Eagle | .......... | H04M 15/735 |
| 9,953,657 B1* | 4/2018 | Demsey | .......... | G10L 19/018 |
| 2007/0038999 A1* | 2/2007 | Millington | .......... | H04J 3/0664 718/100 |
| 2010/0121624 A1* | 5/2010 | Roy | .......... | G06F 17/3089 703/6 |
| 2010/0121801 A1* | 5/2010 | Roy | .......... | G06N 7/005 706/46 |
| 2011/0264639 A1* | 10/2011 | Slivkins | .......... | G06F 17/30867 707/706 |
| 2013/0259379 A1* | 10/2013 | Slaney | .......... | G06K 9/6263 382/190 |
| 2014/0269757 A1* | 9/2014 | Park | .......... | H04L 49/201 370/432 |

(Continued)

*Primary Examiner* — Gerald Gauthier
(74) *Attorney, Agent, or Firm* — Lindauer Law, PLLC (57) ABSTRACT

Described are techniques for selecting an audio device from a group of devices to function as a master device that receives data from a remote source and distributes the data to other devices within the group. Each device is used for this purpose at least once to determine at least one data throughput value attainable by the device. Based on the data throughput values for the devices, signal strength data for the devices, and characteristics of the devices themselves, a master device and a length of time that the audio device is to be used as the master device is determined. Other lengths of time that other devices are to be used temporarily as master devices may also be determined. As additional data throughput values are determined from each instance that a device is used, the determined master device and the lengths of time that each device is used may change.

20 Claims, 6 Drawing Sheets

(56) References Cited

U.S. PATENT DOCUMENTS

| | | | | |
|---|---|---|---|---|
| 2014/0324422 A1* | 10/2014 | Winarski | ............. | H04R 25/554 704/235 |
| 2014/0341399 A1* | 11/2014 | Dusse | ...................... | H04R 5/04 381/150 |
| 2014/0355629 A1* | 12/2014 | Ito | ......................... | H04L 7/0008 370/509 |
| 2015/0019469 A1* | 1/2015 | Ioannidis | ............. | H04N 21/466 706/46 |
| 2015/0094833 A1* | 4/2015 | Clements | ................ | G06F 3/165 700/94 |
| 2015/0095271 A1* | 4/2015 | Ioannidis | ............... | G06Q 30/02 706/12 |
| 2015/0098576 A1* | 4/2015 | Sundaresan | ............ | H04R 29/00 381/58 |
| 2016/0034460 A1* | 2/2016 | Ding | .................... | G06N 99/005 706/12 |
| 2016/0301831 A1* | 10/2016 | Meyer | .................. | H04N 21/242 |
| 2016/0381399 A1* | 12/2016 | Brondijk | ............ | H04N 21/2362 725/116 |
| 2017/0277507 A1* | 9/2017 | Ando | ...................... | G06F 3/165 |
| 2017/0347308 A1* | 11/2017 | Chou | .................... | H04W 24/10 |
| 2018/0049146 A1* | 2/2018 | Daley | .................... | H04H 20/38 |

* cited by examiner

SYSTEM FOR OPTIMIZING DISTRIBUTION OF AUDIO DATA

BACKGROUND

When using a group of audio devices to generate a synchronized audio output, the selection of a particular device to act as a master device for distributing data to other devices may affect the quality of the audio output, and the optimal device for use as a master device may differ as network conditions change.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Multiple audio devices that communicate via one or more networks may be used to provide a synchronized audio output to users within an environment. For example, a user within a home may select a group of audio devices, such as a set of audio devices within a particular room of the home, a set of audio devices located on a particular floor of the home, or all of the audio devices associated with the home, to be used to output a song or other audible sounds. The user may also select an audio application for use, particular audio data to be used to generate the output, and so forth. Typically, one of the audio devices may then function as an audio distribution master device, which receives audio data from a remote source, such as via a connection to an access point for a Wi-Fi® network, then distributes the audio data to at least a subset of the other devices.

In some cases, multiple audio devices may communicate using one or more access points, such as via a Wi-Fi® network or one or more other types of networks. For example, a master device may transmit audio data to other audio devices via shared connections with an access point. Example implementations for forming a group of audio devices that transmit audio data using one or more access points are described in U.S. patent application Ser. No. 15/245,897, filed Aug. 24, 2016, entitled "System for Configuring Distributed Audio Output Using an Access Point", which is incorporated by reference herein in its entirety. In other cases, a group of audio devices may be configured to communicate directly with one another. For example, a master device may be configured to provide audio data to multiple other devices simultaneously via a multicast transmission. Example implementations for forming a group of audio devices in which a master device communicates audio data to multiple slave devices via a multicast transmission are described in U.S. patent application Ser. No. 15/246,070, filed Aug. 24, 2016, entitled "System for Configuring Distributed Audio Output using a Designated Audio Device", which is incorporated by reference herein in its entirety. Other example implementations for distributing audio data to a group of audio devices using multicast transmissions are described in U.S. patent application Ser. No. 15/357,579, filed Nov. 21, 2016, entitled "System for Distributing Audio Output Using Multiple Devices", which is incorporated by reference herein in its entirety. In still other cases, a group of audio devices may communicate audio data using a combination of multicast transmissions and transmissions via an access point. Example implementations for forming such a group of audio devices are described in U.S. patent application Ser. No. 15/373,677, filed Dec. 9, 2016, entitled "System for Configuring Audio Devices to Distribute Audio Data", and in U.S. patent application Ser. No. 15/421,014, filed Jan. 31, 2017, entitled "System for Distributed Audio Output Using Designated Audio Devices". Application Ser. Nos. 15/373,677 and 15/421,014 are incorporated by reference herein in their entirety.

An audio distribution master device may be selected using any of the processes described in the referenced applications or based on characteristics of the devices within a group. However, as network conditions change, such as due to the addition, removal, movement, or use of devices, sources of interference, and so forth, the suitability of each device for use as a master device may change. Described in this disclosure are systems and processes for continuously or periodically determining the most suitable device for use as a master device. Each audio device within a group of audio devices may be used as a master device to receive data from an access point and distribute the data to one or more other audio devices on at least one occasion. A data throughput value for each audio device may be determined in this manner. A data throughput value may indicate a data transfer rate between a master device and another device. In some implementations, one or more audio devices may be excluded from use as a master device. For example, if a received signal strength indicator (RSSI) value or other signal strength value, such as a packet error rate (PER), signal-to-noise ratio (SNR), and so forth, associated with communications between a particular device and an access point deviates from a threshold value or range of values, the particular device may be excluded from use as a master device. Continuing the example, a device may be designated as a slave device if the device is associated with a signal strength value less than a threshold signal strength value. The threshold signal strength value may correspond to a minimum signal strength for receiving audio data at a data transfer rate sufficient to distribute the audio data to other devices and generate an output having a minimum acceptable quality. For example, when transmissions of audio data having low signal strength are used to generate an audio output, the output may be affected by lost data packets, latency, jitter, and so forth, reducing the quality of the output. Therefore, a device having a signal strength value less than the threshold signal strength value may be unsuitable for use as a master device due to the poor quality of an audio output associated with a low data transfer rate. Designation of such a device as a slave device may be used to prevent the device from subsequent use as a master device.

Based on the data throughput values determined for at least a subset of the audio devices, a particular audio device having the greatest data throughput value may be selected for use as an audio distribution master device. Determined data throughput values may include peak throughput values, average throughput values, or other functions based on multiple data throughput values determined over time. In other implementations, other signal quality values in addition to or in place of data throughput values may be determined. For example, one or more of a latency value, a signal strength value, an error rate, a signal-to-noise ratio, or other indications of signal strength or quality may be determined in addition to or in place of a data throughput value. During each instance that the audio distribution master device is used to receive audio data from the access point and transmit audio data to other devices, additional data throughput values or other signal quality values may be determined. For example, an average data throughput value for the audio distribution master device may be periodically or continuously updated as additional values are determined. In some implementations, the average data throughput value may include a moving average value. For example, data throughput values obtained more than a threshold length of time in the past may be excluded from use in determining the average data throughput value.

As discussed previously, each data throughput value for a device may indicate a previously-determined data transfer rate for transmitting audio data from the device to at least one other device. Based on the previous data transfer rates for each device within a group, the determined master device may be used to distribute data to other devices for a count of uses or a period of time. For example, a use may include an instance during which a device is used as a master device responsive to a command to generate an audio output. Continuing the example, during a use, the master device may receive a command to generate an audio output, receive audio data from a source, and distribute the audio data to one or more other devices for generation of an output. As such, a count of uses for a particular device may include a number of times that a command may be received and the particular device may be used as a master device to distribute data to other devices for generation of an audio output, before a different device is used as a master device. After a master device has distributed data for a specific count of uses, or for a specific period of time, a different device may be used as a master device for a count of uses or period of time determined for that device. For example, the length of the period of time or the size of the count of uses for a given device may be proportional to the average data throughput value for the device and inversely proportional to the average data throughput values for other devices. Continuing the example, the length of the period of time or the size of the count of uses for a particular device may increase as the average data throughput value for the particular device increases and decrease as the average data throughput value for the particular device decreases. The length of the period of time or the size of the count of uses may decrease as an average data throughput value for another device increases and increase as the average data throughput value for another device decreases. As one example, a data throughput value for a first audio device may be greater than the data throughput value for a second audio device. Based on this determination, the first audio device may be used as a master device on seven instances responsive to commands to generate an audio output using a selected group of audio devices, while a second audio device within the group may be used as a master device on three instances when commands are received. As another example, the first audio device may be used as a master device on ninety percent of the instances when commands are received while the second audio device is used as a master device on ten percent of such instances. On each instance that an audio device is used as a master device, additional data throughput values or other signal quality values for that device may be determined, which may be used to determine average data throughput values, or other values, for the audio device. Based on the updated values for each audio device, the length of time or size of the count of uses for which each device is used as a master device may change. For example, the device having the greatest average data throughput value may be used as a master device for the majority of uses. However, as the average data throughput value increases, the length of time or count of uses may increase, and as the average data throughput value decreases, the length of time or count of uses may decrease. Similarly, each other device may be used as a master device for a count of uses based in part on the average data throughput value(s) for the particular device. In some implementations, one or more multi-armed bandit algorithms may be used to determine the lengths of time or counts of uses that each device may be used as a master device. For example, previous data transfer rates associated with each device may be treated as inputs (e.g., the reward or payout) associated with the multi-armed bandit algorithm, and the algorithm may be used to determine which device is to be used as a master device upon each instance that audio data is to be distributed. One example multi-armed bandit algorithm is illustrated in Equation 1 below:

$$\rho = T\mu^* - \sum_{t=1}^{T} \hat{r}_t \quad \text{(Equation 1)}$$

In Equation 1, "T" represents a number of rounds that a device is used, "mu" represents the maximal reward mean, which is determined based on the mean values associated with a set of reward distributions for each device, and "r" represents the reward at a given time "t". "Rho" represents the regret, which is the difference between a theoretically optimal strategy and the reward obtained.

The previous data transfer rates and the multi-armed bandit algorithm may be used to generate a model that indicates a count of subsequent commands responsive to which each device is used to transmit audio data to at least one other device. For example, the count of uses associated with a first device may increase as an average data transfer rate or other data throughput value for the device increases, and decrease as the value decreases. The count of uses for the first device may decrease as an average data transfer rate or other data throughput value for another device increases, and increase as the value for another device decreases. When a subsequent command to generate an audio output is received, a current count of subsequent commands may be determined. If the current count is less than a count of uses associated with a particular device, then the particular device may be used as a master device responsive to the command.

In other implementations, other metric values in addition to or in place of data throughput may be used in a multi-armed bandit algorithm to determine a master device for use. For example, a device having a low latency value may be more suitable for use as a master device than a device having a higher latency value, and maximizing the "payout" associated with the algorithm may include minimizing the latency value. As another example, if two devices have similar data throughput and latency values, a device having a lower power consumption may be more suitable for use than a device having a higher power consumption. As yet another example, if a particular device is used frequently by a user, the user's use of the device may consume resources associated with the device, reducing the suitability of the device for use as a master device when compared to a device that is not frequently used by the user.

In some implementations, a RSSI value or other signal strength indicator associated with a device may be used to determine the order in which multiple devices are used as master devices. For example, devices may be used as a master device in descending order, beginning with the device having the greatest RSSI value.

In some implementations, a communication score for one or more of the devices may be determined based on the data throughput values for each device. The communication score may also be affected by one or more other characteristics, such as hardware or software components of the device, a RSSI value or other signal strength indicator associated with the device, a variance in the data throughput values for the device, and so forth. The communication score(s) may be used in lieu of, or in addition to, the data throughout value(s) to determine the device to be used as a master device and the lengths of the periods of time that each device is to be used. A communication score may indicate the suitability of a device for use as a master device. For example, a low communication score may indicate that a device is not suitable for use as a master device while a higher communication score may indicate that a device is more suitable for use as a master device than a device having a lower communication score. Continuing the example, a communication score for an audio device may include a numerical value based on one or more of a data throughput value, signal strength value, or device characteristic associated with the device. A communication score may be determined based on one or more numerical weights or values applied to the metrics and characteristics associated with a device. For example, a first numerical weight associated may be associated with data throughput values while a second, smaller numerical weight is associated with RSSI values, such that a change in a data throughput value for a device more strongly affects the communication score for the device than a change in a RSSI value. Additionally, various characteristics of a device, such as the type or capabilities of the device processor or wireless radio, may be assigned values for determining a communication score. For example, a first type of antenna for a wireless radio may be associated with a value of ten for purposes of determining a communication score, while a second type of antenna is associated with a value of zero. As one example, a communication score may be determined based on the equation $Ax+By+C$, where A and B are weights, x represents a data throughput value for a device, y represents a RSSI value for the device, and C represents a value assigned to a type or category associated with the device or a component of the device. In some implementations, if a communication score for a particular device exceeds a threshold score for a threshold period of time, this may indicate that the device is suitable for continuous use a master device without using other devices as master devices. For example, a communication score of one hundred may indicate that a device is exceptionally suitable for use as a master device. If a communication score of one hundred or greater is achieved for a device and maintained for at least a threshold length of time, such as twenty-four hours, the particular device may be used as a master device on each successive instance that audio data is to be distributed, without using other devices within the group as master devices. In such a case, the communication scores for one or more other devices may be reduced or set to zero.

In some cases, the conditions associated with a network by which the audio devices communicate may change depending on various factors, such as the addition, removal, movement, or use of various devices that may communicate using the network or generate interference that affects the network. For example, at certain times of day in a home, use of a smart television to stream video content may occur. During these times, a particular audio device that may otherwise be suitable for use as the audio distribution master device may experience a reduced data throughput, and a different audio device may be more suitable for use. Thus, in some implementations, the time at which a data throughput value is determined may be stored in association with the data throughput value. Then, at a particular time, the previously-determined data throughput values that correspond to the particular time may be used to select the master device.

In other cases, the network devices that communicate with particular audio devices may affect the selection of an audio distribution master device. For example, if a network includes multiple access points, range extenders, or other similar devices, the particular device with which an audio device communicates to establish a connection with the network may affect the data throughput value associated with the audio device. As such, in some implementations, the particular access point or other device with which an audio device communicated during a time when a data throughput value is determined may be stored in association with that data throughput value. Then, when a master device is selected, the particular network device with which an audio device communicates may be determined, and the previously-determined data throughput values that correspond to that network device may be used to select the master device.

Figure 1:
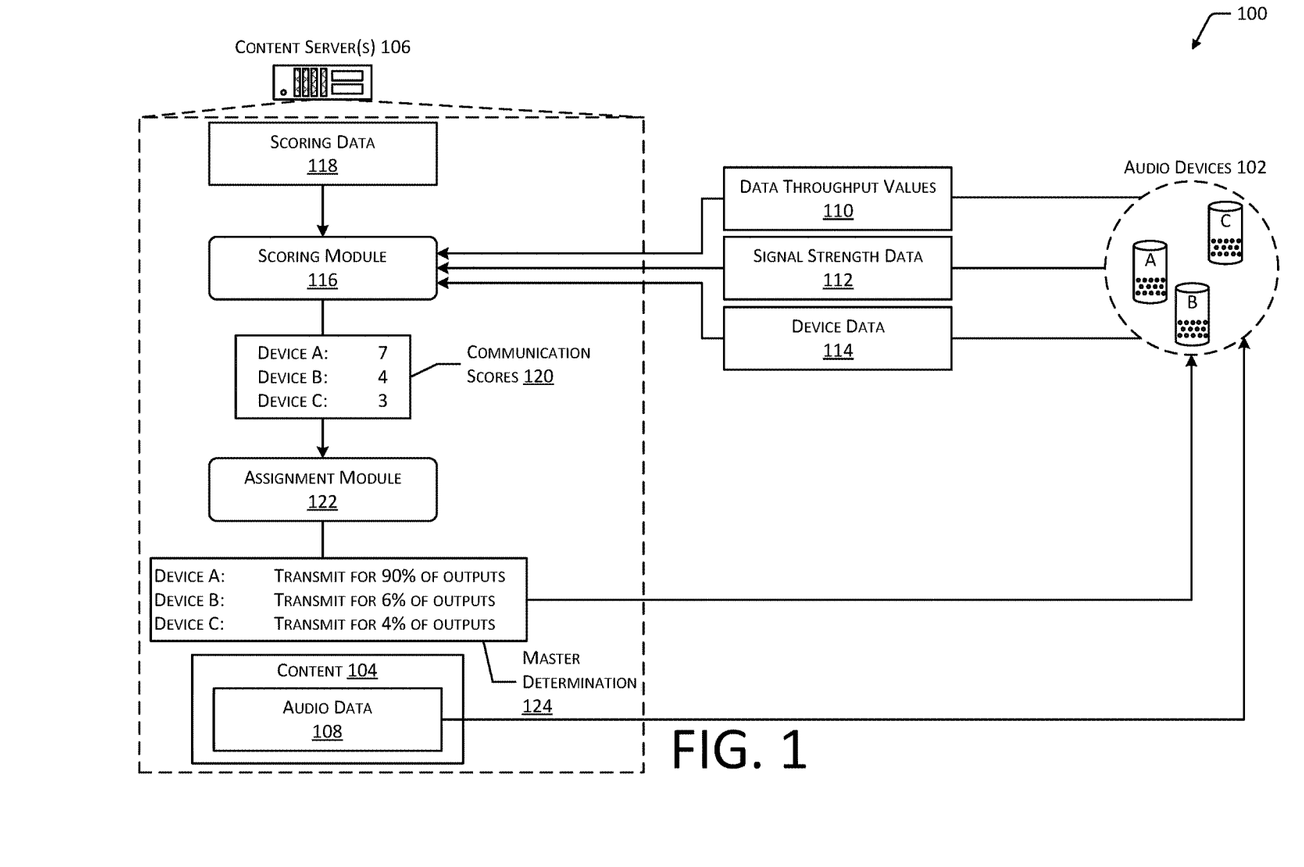
FIG. 1 depicts an implementation of a system for selecting a master device from among a group of audio devices and determining lengths of time that each audio device may be used to transmit audio data to other audio devices to optimize the selection of the master device.

FIG. 1 depicts an implementation of a system 100 for selecting a master device from among a group of audio devices 102 and determining lengths of time for which each audio device 102 may be used to transmit content 104 to other audio devices 102 to optimize the selection of the master device. While FIG. 1 depicts a group of three audio devices 102, in other implementations, any number of audio devices 102 may be used. Additionally, while FIG. 1 depicts the audio devices 102 as freestanding speaker devices, in other implementations, the audio devices may include any type of device that is capable of receiving audio data and generating an audio output, including without limitation, a personal computer, smartphone, portable computer, smart television, automotive computing device, and so forth. Additionally, while implementations associated with use of audio devices 102 are described herein, other implementations may include devices used to distribute other types of data, such as video data. The audio devices 102 may communicate with one another via one or more networks, such as a Wi-Fi® network associated with one or more access points. In some implementations, the audio devices 102 may also be configured to communicate with one another via one or more other communication channels, such as unicast or multicast transmissions, Bluetooth® communication links, and so forth. The audio devices 102 may also communicate with one or more content servers 106 via one or more Wi-Fi® networks. While FIG. 1 depicts a single content server 106, any number of servers or other types of computing devices may perform the functions described herein with regard to the content server(s) 106. Additionally, while FIG. 1 depicts the content server(s) 106 as a server, the content server(s) 106 may include any type of computing devices including, without limitation, personal computers (e.g., desktop or laptop computers), portable computing devices (e.g., smartphones, notebooks, tablet computers, palm-top computers), wearable computing devices, automotive computing devices, gaming systems, smart televisions, set-top boxes, and so forth. Furthermore, in some implementations, one or more of the functions described with regard to the content server(s) 106 may be performed by one or more of the audio devices 102, or by one or more other computing devices in communication with the audio devices 102.

To generate an audio output, the audio devices 102 may receive audio data 108 or other types of content 104 from the content server(s) 106. Specifically, one or more of the audio devices 102, or another computing device in communication therewith, may receive user input indicating a particular group of audio devices and particular audio data 108 for output. One of the audio devices 102, designated as an audio distribution master device, may receive the audio data 108 from the content server(s) 106 or another remote source. The audio distribution master device may then transmit the audio data 108, directly or indirectly, to the other audio devices 102. For example, the audio distribution master device may provide audio data 108 to another audio device 102 via communication links with an access point, via a multicast transmission, or via a combination of communication methods. A combination of communication methods may include, for example, providing the audio data 108 to a first audio device 102 via an access point, which may in turn provide the audio data 108 to one or more other audio devices via a unicast or multicast transmission.

The particular audio device 102 that is used as the audio distribution master device may affect the quality or other characteristics of the audio output. For example, a first audio device 102 may attain a greater data throughput value 110 when used as a master device when compared to a second audio device 102. As another example, due to placement of the audio devices 102 relative to an access point, the presence of interference or objects within the environment, and other network conditions, a RSSI value or other signal strength data 112 associated with a first audio device 102 may be more favorable than the signal strength data 112 associated with a second audio device 102. As yet another example, different types of audio devices 102 may include different hardware or software components, such as antennae, radios, audio applications, and so forth. An audio device 102 may store device data 114 indicative of the hardware or software components of the audio device 102.

Each of the audio devices 102 may be used as a master device on at least one instance, and on each instance, data throughput values 110 associated with communication of audio data 108 by the audio device 102 acting as the master device may be determined. The master device may provide the data throughput value(s) 110 to a scoring module 116 associated with the content server(s) 106. In other implementations, the scoring module 116 may be associated with one or more of the audio devices 102 or with another computing device in communication therewith. In some implementations, the master device may also provide signal strength data 112 indicative of a RSSI value, PER value, SNR value, or other measurement of signal strength or quality to the scoring module 116. In other implementations, the master device may provide, to the scoring module 116, device data 114 indicative of the hardware or software components or other characteristics of the master device.

The scoring module 116 may access scoring data 118, which may include one or more rules, algorithms, threshold values, and so forth, that may be used to generate communication scores 120 based on one or more of the data throughput values 110, the signal strength data 112, and the device data 114. For example, the scoring data 118 may include weights or values that may be applied to one or more of the data throughput values 110, the signal strength data 112, or the device data 114 to determine a communication score 120. The communication scores 120 may include any manner of quantitative or qualitative value indicative of the absolute or relative suitability of an audio device 102 to perform as an audio distribution master device. In some implementations, the scoring data 118 may include one or more "multi-armed bandit" algorithms. For example, a multi-armed bandit algorithm may be used to model an allocation of time or other resources among multiple alternatives, based on the expected "payout" for each alternative. The expected payout may be determined based on the results of previous interactions with each of the alternatives. The typical result of the application of a multi-armed bandit algorithm is a solution that indicates which alternative is associated with the greatest chance of maximizing a payout, the time or number of instances that this alternative should be used (each use generating additional data associated with the expected payout of the alternative), and the time or number of uses that should be spent "exploring" other alternatives to gain additional information about the expected payouts of the other alternatives. In the case of multiple audio devices 102, as depicted in FIG. 1, the data throughput value 110 achieved when a particular audio device 102 is used as the audio distribution master device may be analogous to the payout associated with a multi-armed bandit algorithm. Application of such an algorithm may be used to maximize the data throughput while also indicating the length of time or number of uses that may be used to explore the use of other audio devices 102 as master devices.

Based on the communication scores 120, an assignment module 122 associated with the content server(s) 106, or in some implementations, with one or more of the audio devices 102 or another computing device, may generate a master determination 124. The master determination 124 may indicate a particular audio device 102 to be used as a primary audio distribution master device. The master determination 124 may also indicate a length of time, percentage of time, number of uses, percentage of uses, or percentage chance for a particular use, that each of the audio devices 102 may be used as the audio distribution master device. Devices other than the primary audio distribution master device may be temporarily used as the audio distribution master device to determine additional data regarding the suitability of the audio devices 102 for use as master devices. For example, a first audio device 102 may be used as a master device for a first count of uses, such as eight uses, while a second audio device 102 may be used as a master device for a second count of uses, such as two uses, and a third audio device 102 may be used as a master device for a third count of uses, such as one use. On each instance that the determined master device, and any of the other audio devices 102, is used to distribute audio data 108 to other devices, additional data throughput values 110, signal strength data 112, and so forth may be determined. The additional data may be used to determine new communication scores 120 for the audio device 102 or to modify existing communication scores 120, which may in turn cause the master determination 124 to be modified. For example, an average data throughput value 110 for a master device may be determined based on previously-determined data throughput values 110 for the master device. Continuing the example, an average data throughput value may include a mean, mode, median, or other similar mathematical function based on at least a subset of the previous data throughput values determined for the device. Use of the master device to transmit audio data 108 may enable one or more additional data throughput values 110 for the transmission of the audio data 108 to be determined. The additional data throughput values 110 may cause the average data throughput value 110 for the master device to change. A communication score 120 for the master device that is based on the data throughput values 110 may therefore also change, resulting in a different master determination 124.

Figure 2:
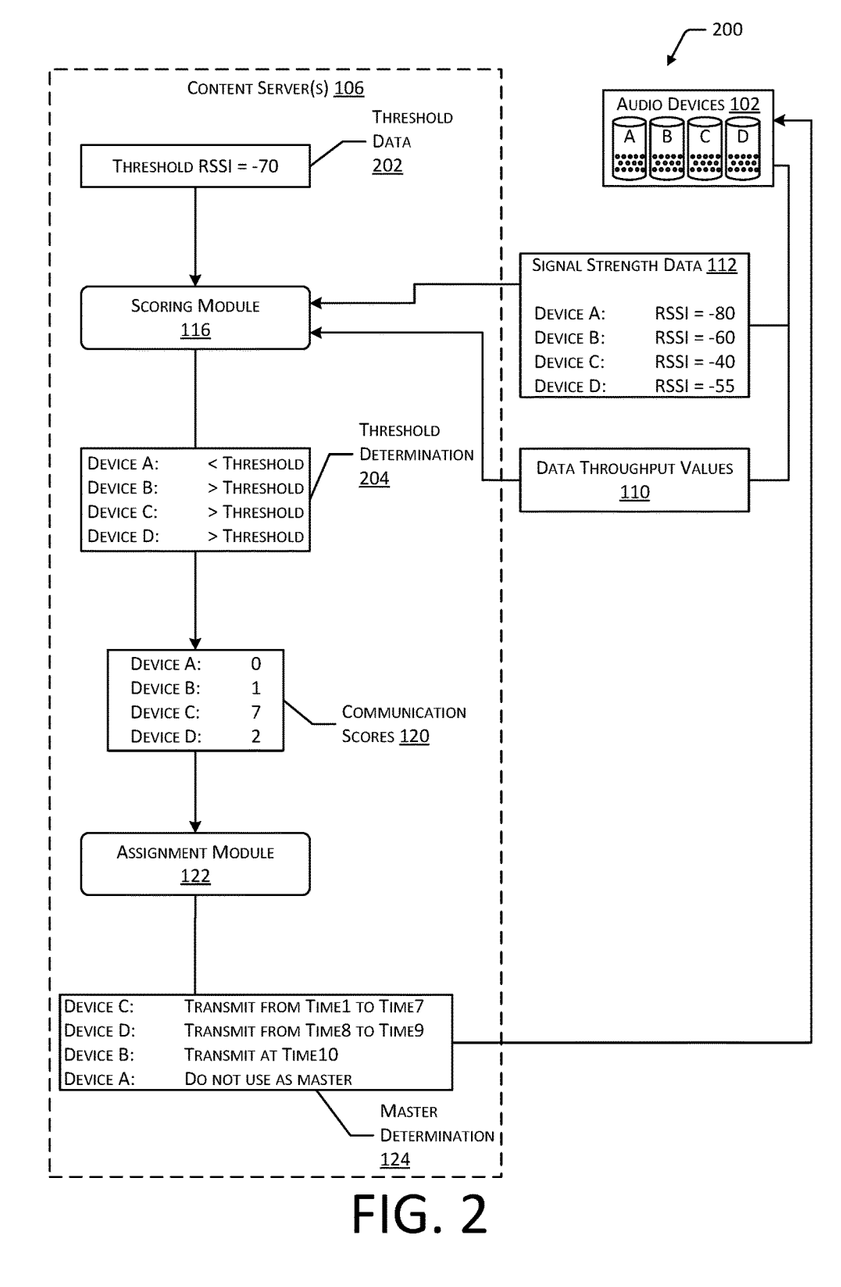
FIG. 2 depicts an implementation of a system for determining lengths of time and an order that each audio device within a group of audio devices may be used as a master device based on signal strength data.

FIG. 2 depicts an implementation of a system 200 for determining lengths of time and an order for which each audio device 102 within a group of audio devices 102 may be used as a master device based on signal strength data 112. As described with regard to FIG. 1, one or more content servers 106 may determine data throughput values 110 and signal strength data 112 from a group of audio devices 102. In other implementations, one or more of the functions described with regard to the content server(s) 106 may be performed by one or more of the audio devices 102 or another computing device in communication therewith. The signal strength data 112 for each audio device 102 may include a RSSI value indicative of signal quality between the audio device 102 and an access point. In other implementations, signal strength data 112 may include one or more of a PER value, a SNR value, and so forth. The scoring module 116 associated with the content server(s) 106 may determine correspondence between the signal strength data 112 and threshold data 202 indicative of a minimum signal quality value for use of an audio device 102 as an audio distribution master device. For example, the signal strength data 112 may indicate RSSI values for four audio devices 102: −80 for "Device A", −60 for "Device B", −40 for "Device C", and −55 for "Device D". The threshold data 202 may indicate a threshold minimum RSSI value of −70. Based on the correspondence between the signal strength data 112 and the threshold data 202, the scoring module 116 may generate a threshold determination 204 indicative of one or more audio devices 102 that are suitable, or not suitable, for use as a master device. For example, due to the RSSI value for "Device A" being less than the threshold value indicated in the threshold data 202, "Device A" may be unsuitable for use as an audio distribution master device. Continuing the example, in response to the threshold determination 204 indicating that the RSSI value for "Device A" is less than a minimum value indicated by the threshold data 202, the communication score 120 may be reduced or set to zero. In other implementations, the threshold data 202 may indicate quantitative or qualitative values for audio devices 102 or metric data determined therefrom. For example, audio devices 102 having certain characteristics may be unsuitable for use as a master device. In such a case, a characteristic of an audio device 102, such as a particular type of wireless radio used by the audio devices 102, may match a threshold value that indicates the particular type of wireless radio. Based on the threshold determination 204 that the characteristic of the audio device matches the threshold value, the communication score 120 for that audio device 102 may be reduced or set to zero.

As described with regard to FIG. 1, the scoring module 116 may also generate communication scores 120 associated with one or more of the audio devices 102 for which the signal strength data 112 exceeds the threshold value. The communication scores 120 for these devices may be based on data throughput values 110 determined from the audio devices 102. In some implementations, the communication scores 120 may also be based in part on the signal strength data 112. In other implementations, the communication scores 120 may be based in part on device data 114. An assignment module 112 associated with the content server(s) 106 may generate a master determination 124 based in part on the communication scores 120. For example, the communication scores 120 may include a value for one or more of the audio devices 102, such as a value of 1 for "Device B", a value of 7 for "Device C", and a value of 2 for "Device D". A communication score 120 for "Device A" may not be calculated due to the RSSI value for "Device A" being less than the threshold value indicated in the threshold data 202. In other implementations, a communication score 120 for devices having a signal strength value less than a threshold value may be determined, while the differential between the signal strength value and the threshold value may affect the resulting communication score 120.

An assignment module 122 associated with the content server(s) 106 may generate a master determination 124 based at least in part on the communication scores 120. The master determination 124 may indicate particular time periods during which at least a subset of the audio devices 102 may be used to transmit audio data 108 to other devices. The master determination 124 may also indicate an order in which the audio devices 102 are to be used as master devices. For example, the audio devices 102 may be used to distribute the audio data 108 in an order based on the signal strength data 112. Continuing the example, after the determined audio distribution master device has been used, the subsequent audio device 102 used to distribute the audio data 108 may be the audio device 102 having the greatest RSSI value. The audio devices 102 may be used in descending order, from the audio device 102 with the greatest RSSI value to the audio device 102 having the least RSSI value. As each audio device 102 is used to distribute audio data, additional data throughput values 110 and signal strength data 112 may be determined, which may affect one or more of the threshold determination 204, the communication scores 120, or the master determination 124.

Figure 3:
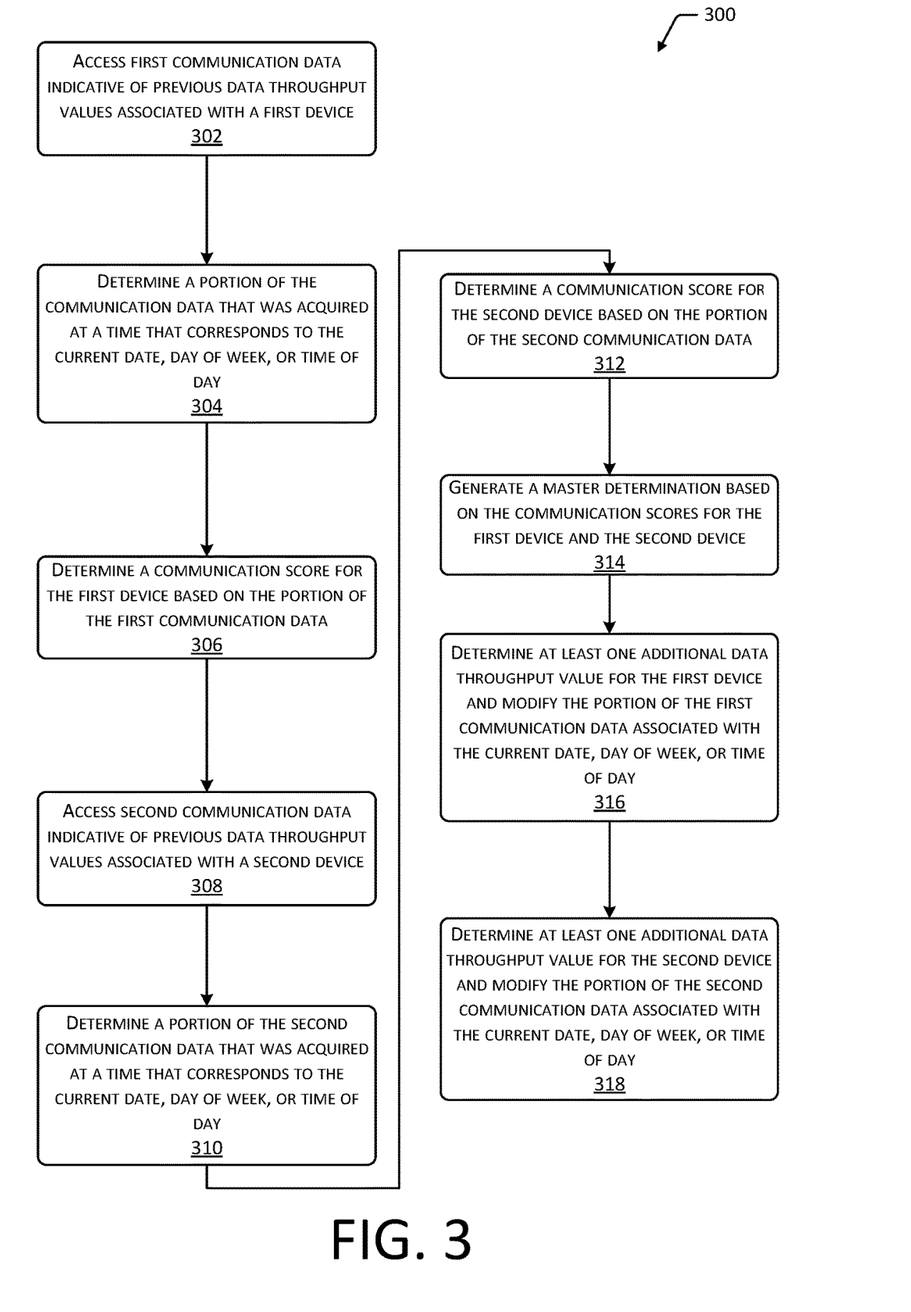
FIG. 3 is a flow diagram illustrating a method for determining a device for use as a master device based on cyclic historical communication data.

FIG. 3 is a flow diagram 300 illustrating a method for determining a device for use as a master device based on cyclic historical communication data. At 302, first communication data indicative of previous data throughput values 110 for a first device may be accessed. Communication data may associate particular data throughput values 110 with corresponding times and dates that the data throughput values 110 were determined, corresponding communication links that were maintained at the times the data throughput values 110 were determined, network conditions associated with the times the data throughput values 110 were determined, and so forth. For example, the communication data may indicate that a particular data throughput value 110 for a particular audio device 102 was determined at 6:00 P.M., at a time when the audio device 102 was in communication with a range extender associated with a home access point, and at a time when two smart televisions in communication with the access point were currently streaming 4K video. As another example, communication data may indicate that a particular data throughput value 110 was determined on a Saturday, while another data throughput value 110 was determined on a Wednesday. As yet another example, communication data may indicate that a particular data throughput value 110 was determined on a particular holiday. Network conditions, such as times when other devices associated with a network are used, may depend in part on the current date, day of the week, or time of day. Therefore, data throughput values 110 determined at a time that corresponds to the current date, day of week, or time of day may be more relevant than other data throughput values 110.

At 304 a portion of the communication data that was acquired at a time that corresponds to a current date, day of week, or time of day may be determined. For example, a clock associated with a content server 106, audio device 102, or other device in communication therewith may determine a timestamp indicative of one or more of the current time or current date. Based on the correspondence between this timestamp and one or more other timestamps indicated in the communication data, a portion of the communication data that includes data throughput values 110 acquired within a threshold range of the current date, day of week, or time of day may be identified. For example, the communication data may be divided into 24 one-hour portions, each corresponding to a one-hour period within a day. As another example, the determined portion of the communication data may include all data throughput values 110 associated with a timestamp that is within a selected range of the current time, such as thirty minutes before or after the current time. As yet another example, the determined portion of the communication data may include all data throughput values 110 determined on a Saturday.

At 306, a communication score 120 for the first device may be determined based on the portion of the first communication data determined at 304. For example, at different times during the day, the communication score 120 for a particular audio device 102 may vary based on previous data throughput values 110 that were determined at corresponding times of the day. Continuing the example, a particular audio device 102 may have a high communication score 120 during the morning, but in the evening, when other devices in the environment are streaming video data, the communication score 120 for the audio device 102 may be much lower. As a result, different audio devices 102 from among a group of audio devices 102 may be the most suitable device for use as a master device at different times of day. Additionally, a different master determination 124 may be generated at different times of day due to the differing communication scores 120 for each device. The differing master determinations 124 may cause different devices to be used to distribute data for different lengths of time.

At 308, second communication data indicative of previous data throughput values 110 associated with a second device may be accessed. At 310, a portion of the second communication data that as acquired at a time that corresponds to the current date, day of week, or time of day may be determined. At 312, a communication score 120 for the second device may be determined based on the portion of the second communication data determined at 310.

At 314, a master determination 124 may be generated based on the communication scores 120 for the first device and the second device. While the example method depicted in FIG. 3 describes two devices, in other implementations, communication data that corresponds to the current date, day of week, or time of day may be determined for any number of devices, communication scores 120 for at least a subset of the devices may be determined, and the master determination 124 may be based on any number of communication scores 120. The master determination 124 may indicate which device is to be used as a master device, a length of time or specific time periods associated with use of the determined device as the master device, lengths of time or specific time periods associated with use of other devices as the master device, an order in which devices are to be used as the master device, and so forth.

At 316, at least one additional data throughput value 110 for the first device may be determined. The additional data throughput value(s) 110 may be used to modify the portion of the first communication data associated with the current date, day of week, or time of day. In some implementations, the communication data may include an average data throughput value 110 based on at least a subset of the previous data throughput values 110 determined during a time period that corresponds to the current date, day, or time. In other implementations, the communication data may include a weighted average value or a moving average value. For example, data throughput values 110 determined at a time earlier than a threshold time may be disregarded when generating communication scores 120 or master determinations 124. Modification of the communication data based on the additional data throughput values 110 may cause the communication scores 120 or the master determination 124 to be modified. At 318, at least one additional data throughput value 110 may be determined for the second device and used to modify the portion of the second communication data associated with the current date, day of week, or time of day.

Figure 4:
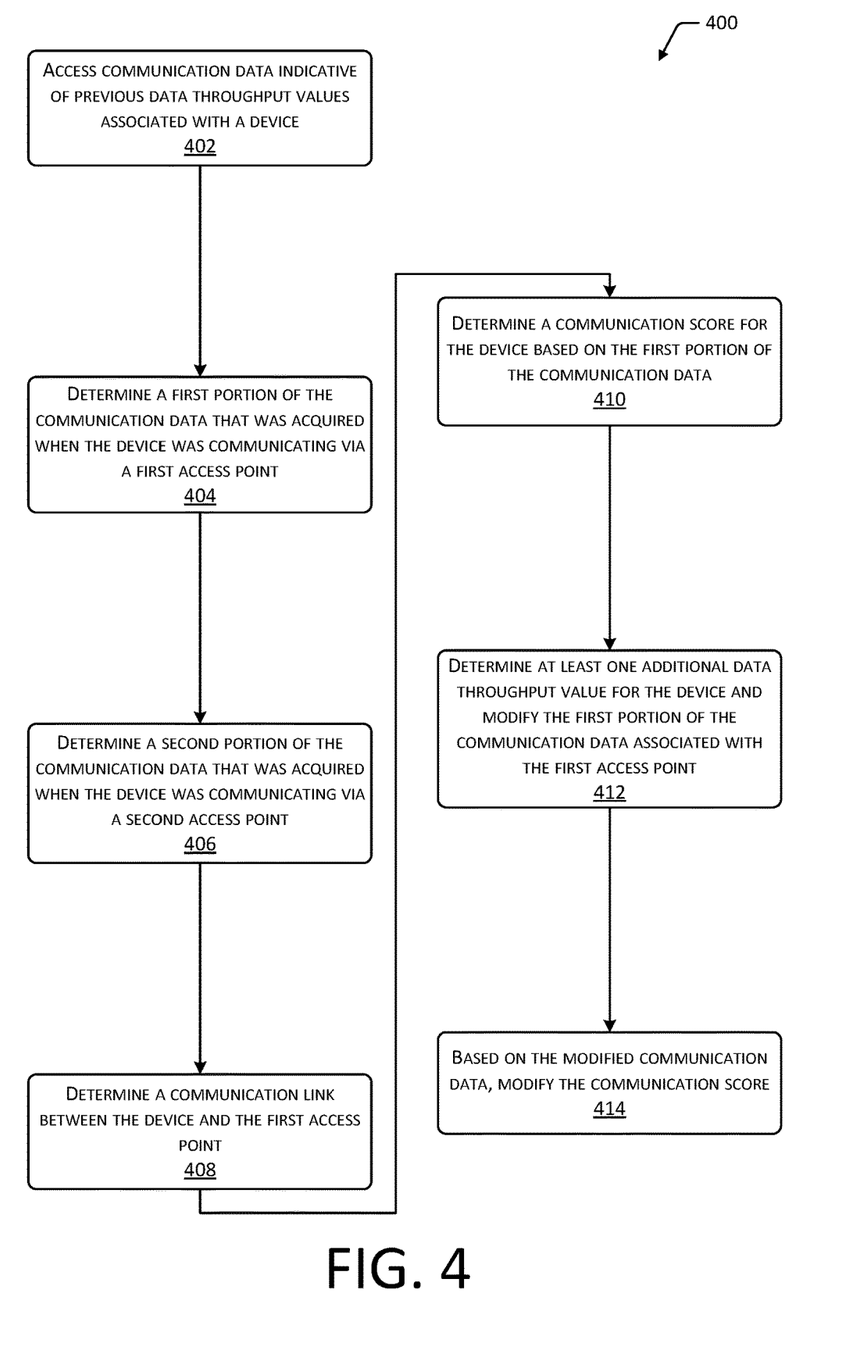
FIG. 4 is a flow diagram illustrating a method for determining communication data relevant to use of a device as a master device based on the communication link(s) maintained by the device.

FIG. 4 is a flow diagram 400 illustrating a method for determining communication data relevant to use of a device as a master device based on the communication link(s) maintained by the device. At 402, communication data indicative of previous data throughput values 110 associated with a device may be accessed. As described with regard to FIG. 3, the communication data may associate particular data throughput values 110 with corresponding times that the data throughput values 110 were determined, corresponding communication links that were maintained at the times the data throughput values 110 were determined, network conditions associated with the times the data throughput values 110 were determined, and so forth.

At 404, a first portion of the communication data that was acquired when the device was communicating via a first access point may be determined. For example, a network may include multiple access points, range extenders, or other types of network devices that may be used to establish communication links with devices. As network conditions change, a particular audio device 102 may establish communication links with different network devices based on the location of the audio device 102, the location of other devices, the utilization of the network, the presence of interference and congestion, and so forth. In the presence of a first set of network conditions, the audio device 102 may communicate with a first network device, while under a different set of network conditions, the audio device 102 may communicate with a different network device. As data throughput values 110 or other communication data is determined, the particular network device with which an audio device 102 communicates may be stored in association with the communication data. For example, at 406, a second portion of the communication data that was acquired when the device was communicating with a second access point may be determined.

At 408, a communication link between the device and the first access point may be determined. Based on the communication link with the first access point, the first portion of the communication data determined at 404, which includes previous data throughput values 110 associated with the first access point, may be more relevant when determining which device would be best suited to function as a master device. At 410, a communication score 120 for the device based on the first portion of the communication data may be determined.

At 412, at least one additional data throughput value 110 for the device may be determined, and the first portion of the communication data that is associated with the first access point may be modified. For example, other data throughput values 110 determined when an audio device 102 communicates with a first network device may be stored in association with the first portion of the communication data. Conversely, data throughput values 110 determined when the audio device 102 communicates with other network devices may be used to modify other portions of the communication data. At 414, based on the modified communication data, the communication score 120 may be modified.

Figure 5:
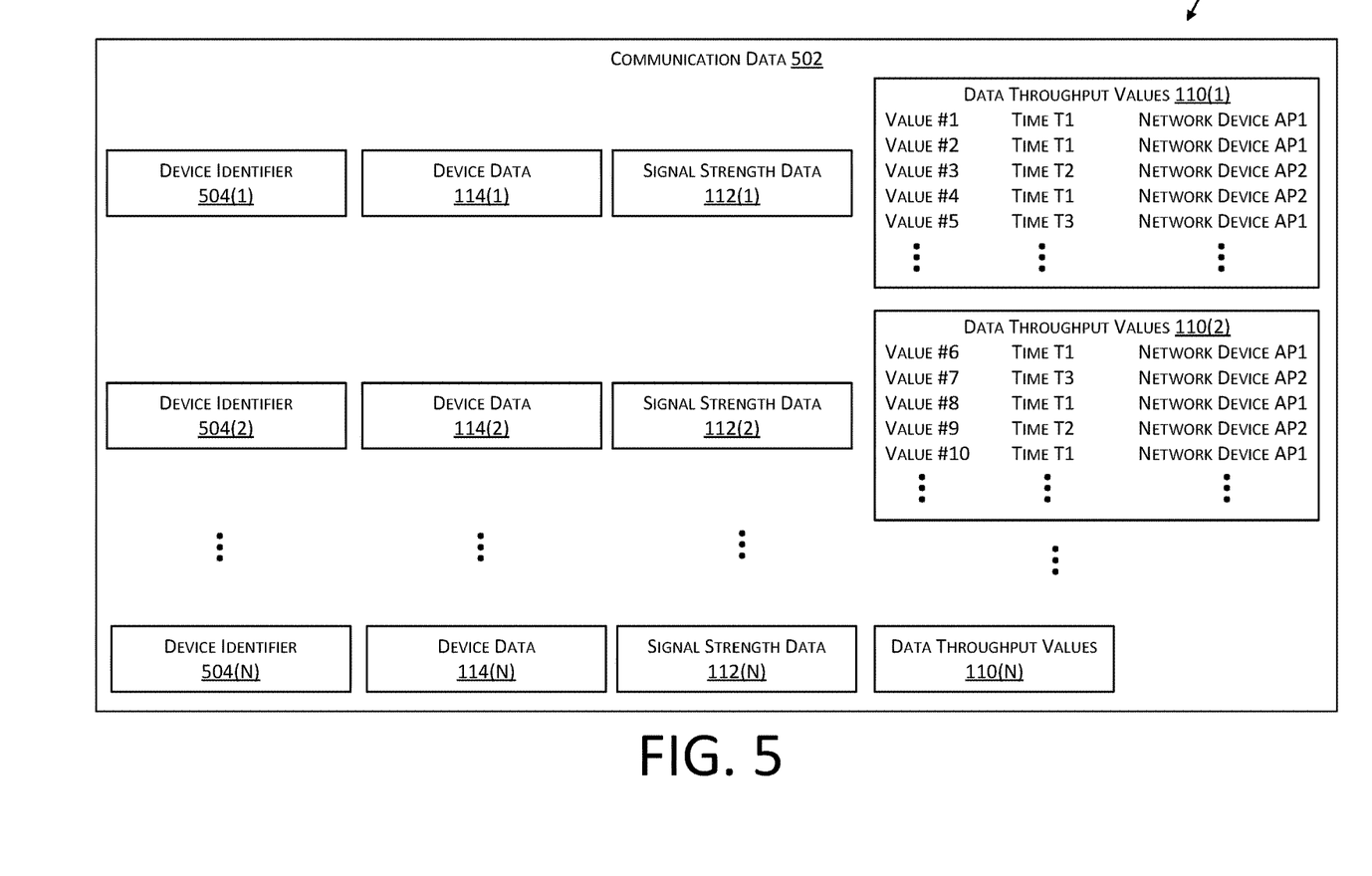
FIG. 5 is a block diagram illustrating example communication data that may be used to determine a device for use as a master device.

FIG. 5 is a block diagram 500 illustrating example communication data 502 that may be used to determine a device for use as a master device. As described with regard to FIGS. 3 and 4, communication data 502 may indicate characteristics of a device, such as hardware and software components of the device, and measured metric data associated with the device, such as signal strength data 112 and data throughput values 110. Communication data 502 may be determined for at least a subset of the devices within a group. For example, the communication data 502 may include a first device identifier 504(1) indicative of a first audio device 102 or other type of device. The device identifier 504(1) may include one or more of alphanumeric data, audio data, video data, image data, and so forth, that may be used to differentiate a particular device from one or more other devices. Similarly, a second device identifier 504(2) may be indicative of a second device, and any number of additional device identifiers 504(N) may indicate other devices.

Device data 114(1) for the first audio device 102 or other type of device may indicate one or more hardware or software characteristics of the device. For example, device data 114(1) may indicate characteristics of the processor of a device, such as an indication of the computational resources available to the device. As another example, device data 114(1) may indicate characteristics of a wireless radio of the device, such as antennae or radio frequency chain characteristics. As yet another example, device data 114(1) may indicate one or more applications, types of audio data 108, and so forth that may be used by the device. As another example, device data 114(1) may indicate a location of a device. Device data 114(2) for the second audio device 102 or other type of device, and device data 114(N) for any number of other devices may indicate similar hardware and software characteristics of the devices. The device data 114 may affect the communication scores 120 and master determination 124 associated with the devices. For example, devices having a powerful processor and wireless radio may be provided with a larger communication score 120 than devices having a less powerful processor and radio. As another example, devices located proximate to an access point or proximate to other devices that may receive data via unicast or multicast transmissions may be provided with a larger communication score 120 than devices more remote from the access point or other devices.

The communication data 502 may also include signal strength data 112(1) for the first audio device 102. Signal strength data 112(1) may include an indication of the strength or quality of signals received from an access point or other network device. For example, the signal strength data 112(1) may include a RSSI value, a PER value, a SNR value, a received channel power indicator (RCPI) value, and so forth. In some implementations, the signal strength data 112(1) may include multiple values determined at different times. For example, the signal strength data 112(1) may include an average RSSI value for a device, a moving average, a weighted average, and so forth. Signal strength data 112(2) for the second device and signal strength data 112(N) for any number of additional devices may include similar types of values indicative of the strength of quality of signals received by the devices from the access point. The signal strength data 112 may affect the communications scores 120 and master determination 124 associated with the devices. For example, devices having a higher signal quality with regard to an access point may be provided with a larger communication score 120 than devices having a lower signal quality. In some implementations, signal strength data 112 may be associated with particular times and particular access points or other network devices, as described with regard to the data throughput values 110 of FIGS. 3 and 4. For example, signal strength data 112 for an audio device 102 may vary cyclically depending on the time of day and other conditions associated with the network, and may vary depending on which network device communicates with the audio device 102.

The communication data 502 may also include one or more data throughput values 110(1) for the first device. As described with regard to FIGS. 3 and 4, in some implementations, each data throughput value 110(1) may be associated with a particular time when the data throughput value 110(1) was determined and a particular network device that communicated with the audio device 102 at the time that the data throughput value was determined 110(1). Similarly, data throughput values 110(2) associated with a second device and data throughput values 110(N) for one or more additional devices may be associated with particular times and network devices. In some implementations, when a communication score 120 based on the data throughput values 110 is determined, the communication score 120 may be based only on data throughput values 110 that correspond to a current time. For example, data throughput values 110 acquired within one hour of a current time may be more relevant when determining a suitable master device when compared to data throughput values 110 acquired at other times. In other implementations, when a communication score 120 based on the data throughput values 110 for an audio device 102 is determined, the communication score 120 may be based only on data throughput values 110 that correspond to a network device that is currently in communication with the audio device 102. For example, data throughput values 110 acquired when the audio device 102 is maintaining a communication link with a particular network device may be more relevant at subsequent times when the audio device 102 communicates with the particular network device, rather than at times when the audio device 102 communicates with other network devices. In still other implementations, when a communication score 120 based on the data throughput values 110 for an audio device 102 is determined, the communication score 120 may be based only on data throughput values 110 determined within a threshold period of time. Data throughput values 110 determined before a threshold time may be less relevant or non-relevant regarding selection of a master device, while data throughput values 110 determined more recently may be more relevant for such a selection. In some cases, when determining a communication score 120, data throughput values 110 may be weighted, such that more recently-determined data throughput values 110 affect the communication score 120 more strongly than less recently-determined data throughput values 110.

Figure 6:
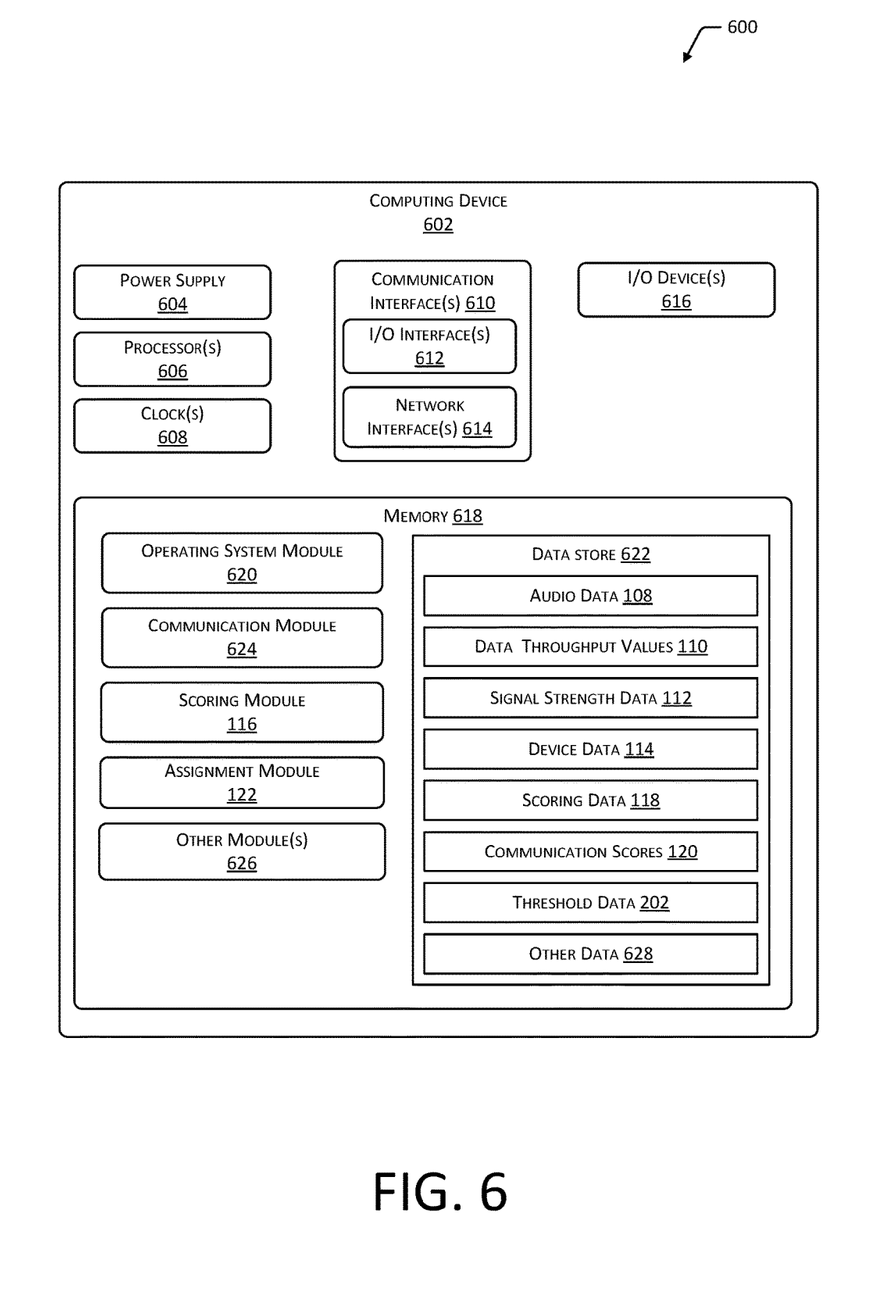
FIG. 6 is a block diagram illustrating a computing device within the scope of the present disclosure.

FIG. 6 is a block diagram 600 illustrating a computing device 602 within the scope of the present disclosure. While FIG. 6 depicts a single computing device 602, in other implementations, the functions described with regard to the computing device 602 may be performed by any number and any type of computing devices 602. For example, the computing device 602 may include any combination of content servers 106, audio devices 102, or other computing devices 602 in communication therewith.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. As another example, data from the clock 608 may be used to determine times when particular data throughput values 110 or signal strength data 112 is determined, the lapse of periods of time to use particular devices as master devices, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processor(s) 606. The OS module 620 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with other computing devices 602.

The memory 618 may also store the scoring module 116. The scoring module 116 may determine one or more of data throughput values 110, signal strength data 112, or device data 114 from audio devices 102 or other types of computing devices 602. Based on correspondence between the data throughput values 110, signal strength data 112, or device data 114 and scoring data 118, the scoring module 116 may determine a communication score 120 for the device. For example, scoring data 118 may include one or more rules, algorithms, and so forth that associate particular data throughput values 110, signal strength data 112, and device data 114 with weights, constants, and values, to enable a communication score 120 to be determined using at least the data throughput values 110, signal strength data 112, and device data 114 as inputs. In some implementations, the scoring module 116 may also determine portions of the data throughput values 110, or other data, that correspond to threshold data 202. For example, the threshold data 202 may indicate a threshold time. Data throughput values 110 that were determined before the threshold time may be disregarded when determining a communication score 120. As another example, the threshold data 202 may indicate a threshold signal strength value. Devices having a signal strength that is below the threshold signal strength value may be excluded from use as a master device. Continuing the example, communication scores 120 for particular devices may be reduced or set to zero based in part on the threshold data 202.

The memory 618 may additionally store the assignment module 122. The assignment module 122 may generate a master determination 124 based at least in part on the communication scores 120 for a group of devices. For example, a master determination 124 may include one or more of an indication of a master device, a length of time that the master device is to be used as a master device, an indication of one or more other devices that are to be temporarily used as a master device, lengths of time associated with use of the one or more other devices, and an order in which the one or more other devices are to be used. Continuing the example, the scoring data 118 or additional data in the data store 602 may associate communication scores 120 with one or more portions of the master determination 124. In some cases, the scoring data 118 may associate communication scores 120 with corresponding lengths of time that a device is to be used.

The memory 618 may additionally store the thresholding module 202. The thresholding module 202 may determine portions of the data throughput values 110, or other data, that correspond to threshold data 202. For example, the threshold data 202 may indicate a threshold time. Data throughput values 110 that were determined before the threshold time may be disregarded when determining a communication score 120. As another example, the threshold data 202 may indicate a threshold signal strength value. Devices having a signal strength that is below the threshold signal strength value may be excluded from use as a master device.

Other modules 626 may also be present in the memory 618. For example, other modules 626 may include user interface modules for receiving user input selecting audio data 108 for output, particular audio devices 102 for use, and so forth. Other modules 626 may also include encryption modules to encrypt and decrypt communications between computing devices 602. Other modules 626 may also include configuration modules to receive and modify user settings, configurations, and preferences, default settings, and so forth.

Other data 628 within the data store 622 may include default configurations and settings associated with computing devices 602, security data, such as encryption keys and schema, access credentials, and so forth. Other data 628 may include rules and algorithms that associate communication scores with master determinations 124, or weights for data throughput values 110 based on times, locations, signal strength data 112, and so forth.

In different implementations, different computing devices 602 may have different capabilities or capacities. For example, content servers 106 may have significantly more processor 606 capability and memory 618 capacity compared to the processor 606 capability and memory 618 capacity of audio devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first audio device;
a second audio device;
one or more memories of the first audio device storing computer-executable instructions; and
one or more hardware processors of the first audio device, wherein the one or more hardware processors execute the computer-executable instructions to:
   access a first data throughput value indicative of a first previous data transfer rate for transmitting first audio data from the first audio device to the second audio device;
   access a second data throughput value indicative of a second previous data transfer rate for transmitting second audio data from the second audio device to the first audio device, wherein the first previous data transfer rate exceeds the second previous data transfer rate;
   access a multi-armed bandit algorithm that includes the first previous data transfer rate and the second previous data transfer rate as inputs;
   generate a model using the multi-armed bandit algorithm, wherein the model indicates:
      a first count of subsequent commands to generate an audio output responsive to which the first device is used to transmit audio data to the second device; and
      a second count of the subsequent commands responsive to which the second device is used to transmit audio data to the first device, wherein the second count is less than the first count;
   receive a command to generate an audio output;
   determine that a current count of subsequent commands is less than the first count; and
   in response to the command, use the first device to receive audio data from a source and transmit the audio data to the second device for generation of the audio output.

2. The system of claim 1, further comprising:
a third audio device; and
computer-executable instructions to:
   determine that a first signal strength value associated with communication between the first audio device and an access point is greater than a threshold signal strength value that corresponds to a minimum signal strength for receiving audio data at a data rate sufficient for generation of an audio output;
   determine that a second signal strength value associated with communication between the second audio device and the access point is greater than the threshold signal strength value;
   determine that a third signal strength value associated with communication between the third audio device and the access point is less than the threshold signal strength value; and
   in response to the third signal strength value being less than the threshold signal strength value, designate the third audio device as a slave device for receiving data from the first audio device and the second audio device.

3. The system of claim 1, further comprising computer-executable instructions to:
   determine a current time;
   determine a time at which the first previous data transfer rate was determined;
   determine that the current time is between a first time and a second time, wherein the first time and the second time define a period of time that includes the time at which the first previous data throughput was received, and wherein the period of time corresponds to one or more of a time of day, a day of a week, or a particular date; and
   use the first audio device to send the audio data for the first count of uses in response to the current time being between the first time and the second time.

4. The system of claim 1, further comprising computer-executable instructions to:
   determine a first identifier associated with an access point in communication with the first audio device;
   generate a second identifier using the first audio device, wherein the second identifier is associated with the first previous data transfer rate and indicates a particular access point from which the first audio device received the first audio data;
   determine that the first identifier matches the second identifier; and
   use the first audio device to send the audio data for the first count of uses in response to the first identifier matching the second identifier.

5. A method comprising:
accessing first communication data indicative of a first data throughput value associated with transmission of data from a first device to a second device;
determining a first communication score based at least in part on the first data throughput value;
accessing second communication data indicative of a second data throughput value associated with transmission of data from the second device to the first device;
determining a second communication score based at least in part on the second data throughput value;
determining that the first communication score is greater than the second communication score;
transmitting first data from the first device to the second device for one or more of a first count of uses or a first period of time, wherein the first count of uses or the first period of time is determined based at least in part on the first communication score; and
transmitting second data from the second device to the first device for one or more of a second count of uses or a second period of time, wherein the second count of uses or the second period of time is determined based at least in part on the second communication score, and wherein (i) the second count of uses is less than the first count of uses or (ii) the second period of time is less than the first period of time.

6. The method of claim 5, further comprising:
determining first device data associated with the first device, wherein the first device data is indicative of a characteristic of a first radio or a first processor of the first device, wherein the first communication score is further determined based at least in part on the first device data; and
determining second device data associated with the second device, wherein the second device data is indicative of a characteristic of a second radio or a second processor of the second device, wherein the second communication score is further determined based at least in part on the second device data.

7. The method of claim 5, further comprising:
  determining a first signal strength value associated with communication between the first device and an access point, wherein the first communication score is further determined based at least in part on the first signal strength value; and
  determining a second signal strength value associated with communication between the second device and the access point, wherein the second communication score is further determined based at least in part on the second signal strength value.

8. The method of claim 5, further comprising:
  determining that a first signal strength value associated with communication between the first device and an access point is greater than a threshold signal strength value; and
  causing the first device to transmit the first data in response to the first signal strength value exceeding the threshold signal strength value.

9. The method of claim 5, further comprising:
  determining first device data associated with the first device, wherein the first device data is indicative of a characteristic of one or more of a first radio or first processor of the first device; and
  determining second device data associated with the second device, wherein the second device data is indicative of a characteristic of one or more of a second radio or second processor of the second device;
  accessing scoring data that associates first weights with data throughput values and second weights with characteristics of devices;
  determining the first communication score based on correspondence between the scoring data, the first data throughput value, and the first device data; and
  determining the second communication score based on correspondence between the scoring data, the second data throughput value, and the second device data.

10. The method of claim 9, further comprising:
  determining a first signal strength value associated with communication between the first device and an access point;
  determining a second signal strength value associated with communication between the second device and the access point;
  determining that the first signal strength value is greater than the second signal strength value; and
  causing the first device to transmit the first data to the second device prior to causing the second device to transmit the second data to the first device.

11. The method of claim 5, further comprising:
  determining that a first portion of the first communication data was determined at or prior to a threshold time; and
  wherein the first communication score is determined based on the first portion of the first communication data.

12. The method of claim 5, wherein the first communication data includes a first portion that was determined at a first time or a first date, the method further comprising:
  determining that the current time is within a threshold range of the first time or the first date, wherein the threshold range corresponds to a period of time that includes the first time or the first date; and
  determining, based on the first portion of the first communication data, the first communication score.

13. The method of claim 5, wherein the first communication data includes a first portion associated with data throughput values determined via a first communication link with a first access point, the method further comprising:
  determining that a current communication link exists between the first device and the first access point; and
  determining the first communication score using the first portion of the first communication data.

14. A system comprising:
  one or more memories storing computer-executable instructions; and
  one or more hardware processors to execute the computer-executable instructions to:
    determine first communication data indicative of one or more first signal quality values associated with a first device;
    determine one or more of a first count of uses or a first period of time that corresponds to the one or more first signal quality values;
    determine second communication data indicative of one or more second signal quality values associated with a second device;
    determine one or more of a second count of uses or a second period of time that corresponds to the one or more second signal quality values;
    determine that at least a first subset of the one or more first signal quality values is greater than at least a second subset of the one or more second signal quality values;
    cause the first device to receive the first data from an access point;
    cause the first device to transmit the first data to the second device for the first count of uses or the first period of time;
    cause the second device to receive second data from the access point; and
    cause the second device to transmit the second data to the first device for the second count of uses or the second period of time.

15. The system of claim 14, further comprising computer-executable instructions to:
  access scoring data that associates weights with respective signal quality values;
  determine correspondence between the one or more first signal quality values and the scoring data;
  determine a first communication score for the first device based at least in part on the correspondence between the scoring data and the one or more first signal quality values;
  determine correspondence between the one or more second signal quality values and the scoring data;
  determine a second communication score for the second device based at least in part on the correspondence between the scoring data and the one or more second signal quality values; and
  determine that the first communication score is greater than the second communication score.

16. The system of claim 15, further comprising computer-executable instructions to:
  determine a third signal quality value associated with transmission of the first data by the first device;
  determine a third communication score based on the first communication score and the third signal quality value; and
  determine, based in part on the third communication score, a third count of uses or a third period of time for transmission of third data by the first device.

17. The system of claim 15, wherein the one or more first signal quality values include a first value and a second value, the system further comprising computer-executable instructions to:
- determine a third value associated with transmission of the first data by the first device;
- determine that the first value is associated with a first time prior to a threshold time;
- determine that the second value is associated with a second time subsequent to the threshold time; and
- determine that the third value is associated with a third time subsequent to the threshold time;
- wherein the first communication score is determined based in part on the second value and the third value.

18. The system of claim 15, further comprising computer-executable instructions to:
- determine that the first communication score exceeds a threshold communication score for at least a threshold period of time; and
- in response to the first communication score exceeding the threshold communication score, set the second count of uses or the second period of time to zero.

19. The system of claim 14, further comprising a third device and computer-executable instructions to:
- determine that a signal strength value associated with communication between the third device and the access point is less than a threshold signal strength value; and
- designate the third device as a slave device for receiving data from the first device and the second device in response to the signal strength value being less than the threshold signal strength value.

20. The system of claim 14, further comprising computer-executable instructions to:
- determine an addition of a third device to a network associated with the first device and the second device;
- in response to the addition of the third device, cause the third device to receive third data from the access point and transmit the third data to at least the first device and the second device;
- determine one or more third signal quality values associated with the third device; and
- based in part on the one or more third signal quality values, determine a third count of uses or a third period of time associated with transmission by the third device.

* * * * *